UNITED STATES PATENT OFFICE.

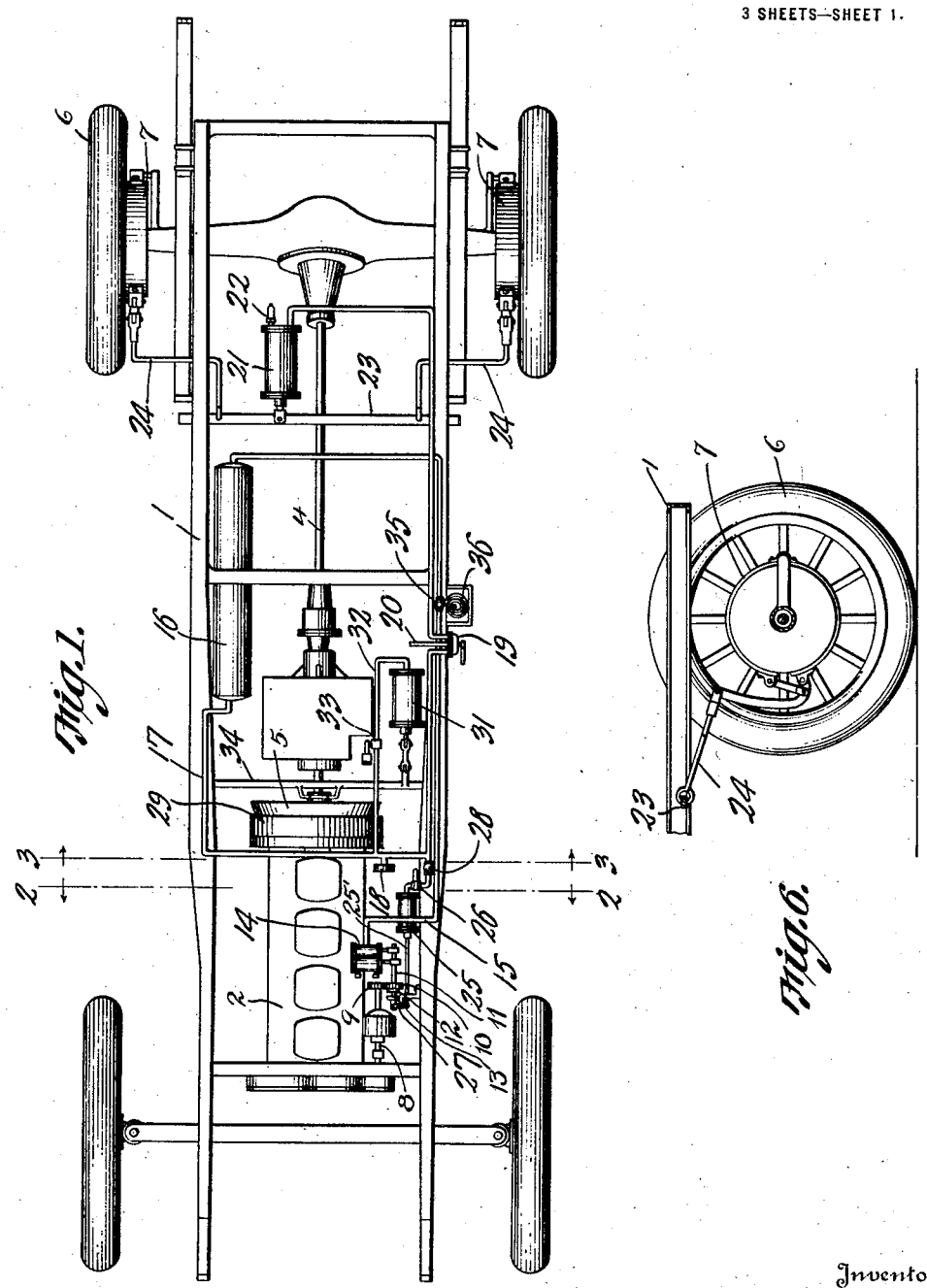

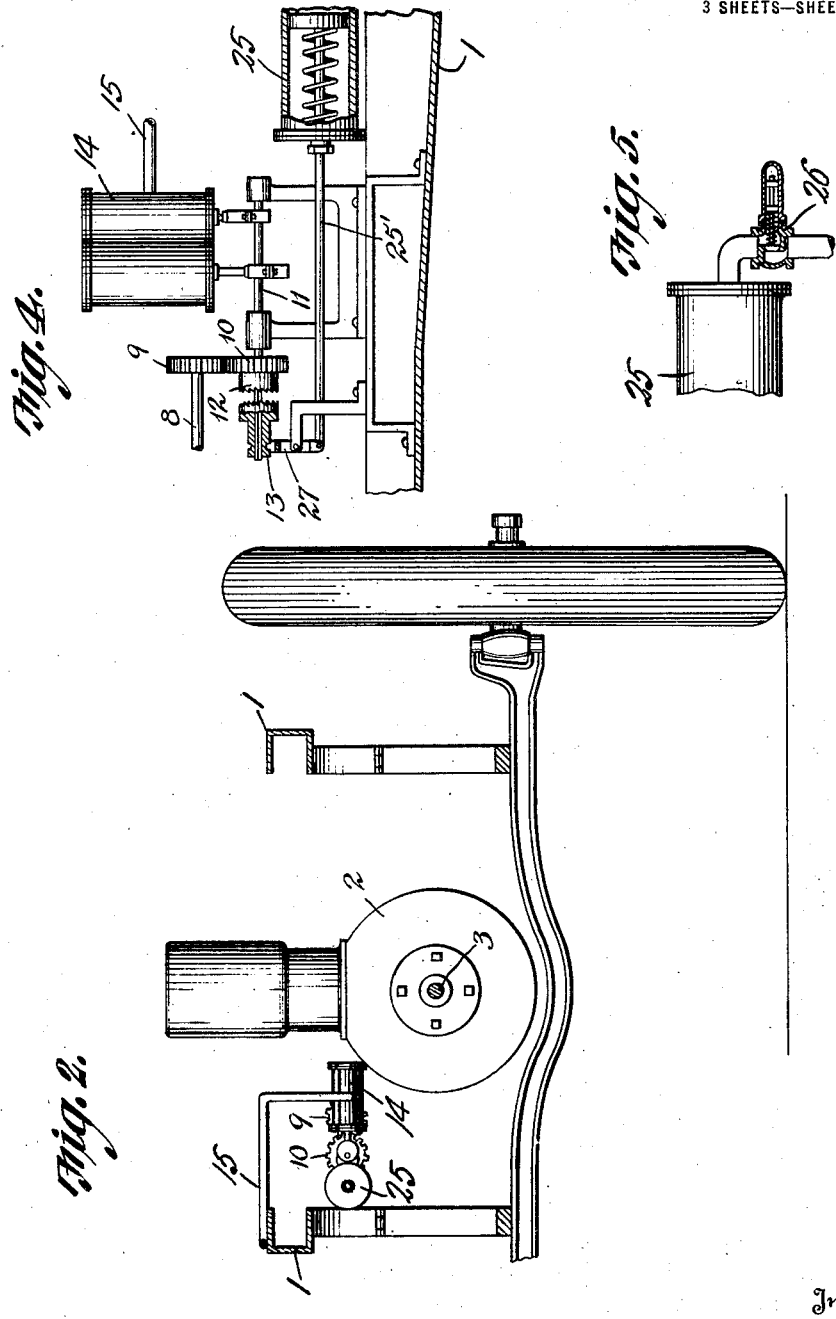

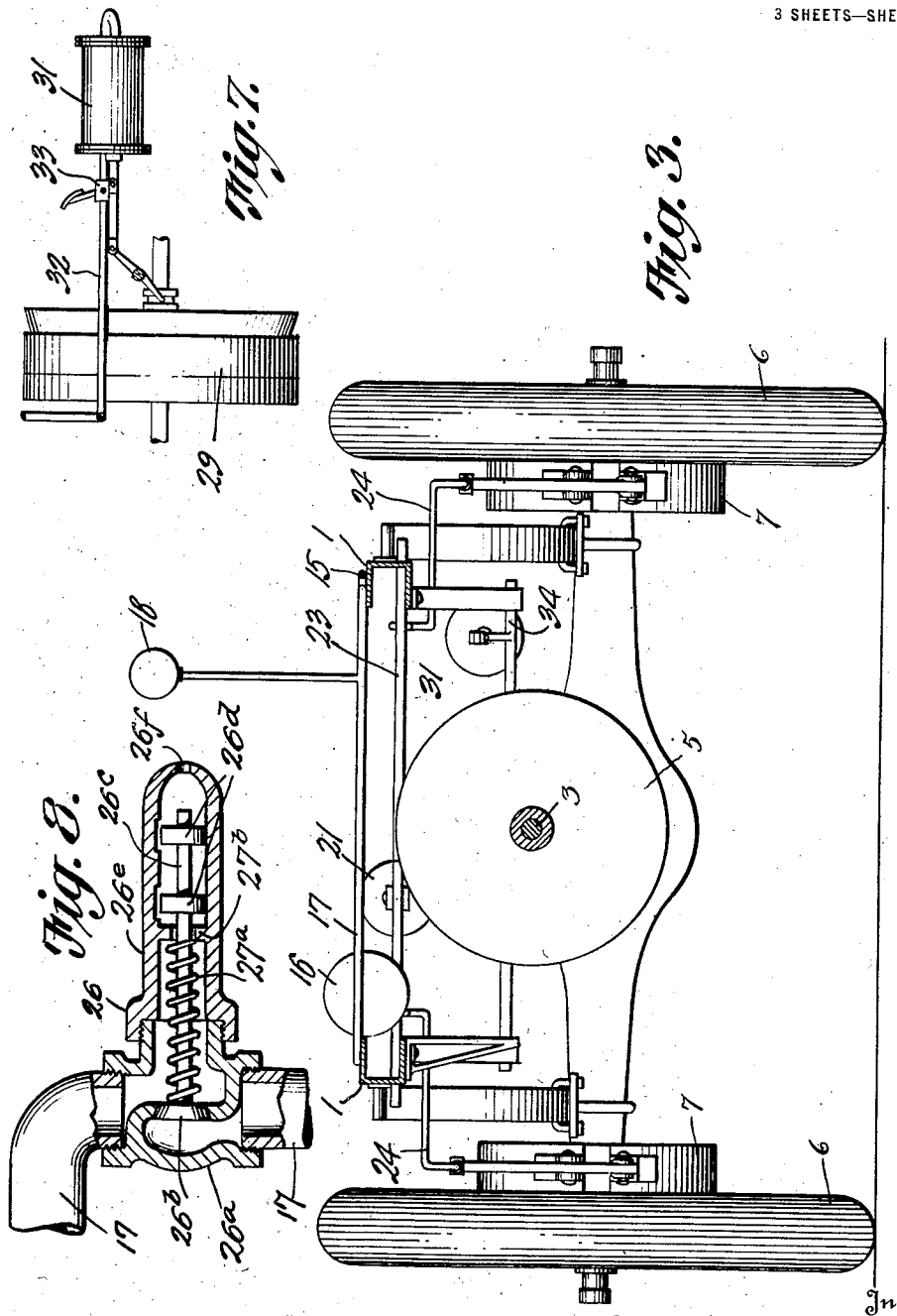

WALTER H. UTTERBAUGH, OF COLUMBUS, OHIO.

AIR-BRAKE SYSTEM FOR MOTOR-CARS.

1,322,377. Specification of Letters Patent. Patented Nov. 18, 1919.

Application filed February 9, 1916. Serial No. 77,351.

*To all whom it may concern:*

Be it known that I, WALTER H. UTTERBAUGH, a citizen of the United States, residing at Columbus, in the county of Franklin and State of Ohio, have invented certain new and useful Improvements in Air-Brake Systems for Motor-Cars, of which the following is a specification.

This invention relates to an air brake system for motor cars, one object of the invention being the provision of a system that can be operated by a person with ease to apply the brake to bring the car to a halt, the cumbersome lever being dispensed with or used merely as an auxiliary.

A further object of the present invention is the provision of an air brake system that is provided with means for applying the brake bands of the rear drive wheels and also the main clutch, so that the car can be readily halted in the shortest space or slowed down gradually and with ease of operation.

With the foregoing and other objects in view, the invention resides in the details of construction hereinafter set forth, the scope of the invention being limited only by what is claimed.

In the accompanying drawings:—

Figure 1, is a top plan view of a motor car chassis with my air brake system applied.

Fig. 2, is an enlarged section on line 2—2 of Fig. 1.

Fig. 3 is a similar view of line 3—3 of Fig. 1.

Figs. 4, 5, 6, 7 and 8, are detail views of various parts of the apparatus.

Referring to the drawings, there is shown the chassis 1 of a motor vehicle which has mounted thereon a motor 2 having a drive shaft 3 which is operably connected to the driven shaft 4 by means of a clutch 5. Rear wheels 6 are mounted on the driven shaft and are provided with the band brakes 7.

A rotatably mounted shaft 8 is operably connected to the drive shaft 3 and carries a gear 9 on its one end, this gear meshing with another gear 10 which is loosely carried on another rotatably mounted shaft 11. A clutch member 12 is carried by the gear 10, being formed with the latter, and with this clutch member there coöperates a second clutch member 13, which is mounted on the shaft 11 in such a manner that it may move longitudinally along the shaft but is precluded from angular movement thereon. The purpose of these parts appears hereinafter.

Mounted in the forward portion of the chassis there is a cross compound air compressor, the piston rods of which are operably connected to the shaft 11 and when the clutch members 12 and 13 are in engagement with each other (such engagement being provided for as is hereinafter made apparent) motion will be transmitted from the drive shaft to the piston rods, as is evident. Leading from the compound air compressor or pump cylinders, there is the pipe 15 which extends to the main reservoir 16, the pipe 17 being led from the latter and having connected therein the gage 18. This pipe 17 has connected in it the hand operated valve 19, to which there is also connected the exhaust pipe 20. There is also connected to the pipe 17 the brake cylinder 21, this cylinder being equipped with the pop valve 22. The brake beam 23 is operably connected to the brake cylinder 21 and is also operably connected to the band brakes 7, the latter connection being by means of rods 24. Thus when the brake cylinder operates the beam 23, the band brakes will be applied or released.

There is also connected to the pipe 17 a cylinder 25 which is automatically controlled by means of an automatic controlling device, generally designated 26, so that when the pressure in the reservoir drops below a certain point, the compressor may be operated by the admission of the air under pressure into the cylinder 25. This automatic controller 26 comprises a valve casing $26^a$ in which there is carried a valve $26^b$, the latter being formed with a stem $26^c$ which carries a pair of pistons $26^d$, which stand in spaced relation to each other. Threadingly attached to the valve casing $26^a$ there is a tubular member $26^e$ and this member is formed at one extremity with an outlet hole or perforation $26^f$, the tubular member inclosing the stem $26^c$ and the pistons $26^d$, as well as inclosing a spring $27^a$ which surrounds the stem and bears one end against an annular flange $27^b$ formed in the tubular member and the other end against the valve $26^b$. The spring thus tends to unseat the valve, but when the valve is seated, as it is evident it will be when the pressure in the reservoir is high enough, the pistons are by-passed by grooves formed on the interior walls of the tubular member $26^e$. If the pressure in the reservoir falls below a certain point, the spring 27ª will unseat the valve at the same time moving the pistons toward the annular flange 27ᵇ, thus shutting off the by-passes, when air will be admitted to the cylinder 25. The cylinder 25 is equipped with a piston connecting with its piston rod 25′ and this piston is held normally at the rear end of the cylinder through the action of a spring surrounding the piston rod and having one end bearing on the piston and the other on the inner face of the forward end of the cylinder. The admission of air into cylinder 25 will, therefore, force the piston to the forward end of the cylinder against the pressure of the spring, thus moving the piston rod 25′ forwardly and as this piston rod 25′ is pivotally connected to the fulcrumed yoke 27 which is operably connected to the clutch member 13, the latter will be moved into engagement with the clutch member 12 with the result that a driving connection will be effected between the engine and the compressor, thus raising the pressure in the reservoir 16 until the said pressure reaches a point where it will act on the pistons 26ᵈ to reseat the valve 26ª. At this time the piston in the cylinder 25 will be relieved from pressure and restored to its former position by its actuating spring, since the air behind the piston may find its way to the atmosphere through the tubular member 26ᵉ, the by-passes 27ᶜ and the perforation or port 26ᶠ. This operation releases the clutch members and thereby throws the compressor out of operative connection with the engine.

A hand valve 28 is mounted in the pipe 17 so that the desired pressure for pumping tires may be secured by cutting out the automatic control valve 26.

In order to provide a means for applying a brake 29 to the main clutch between the drive and driven shafts of the motor car, the brake cylinder 31 is employed, it being connected with the pipe 17 by means of the pipe 32. A foot operated valve 33 is carried in the pipe 32 so that the brake cylinder 31 may be operated when desired. This cylinder, as is shown, is operably connected to the brake beam 34 which in turn is connected to the brake 29.

It will thus be seen that when the valve 19 is operated the brake cylinder 21 is controlled and the brakes 7 applied, while by operating the valve 33 by foot, the cylinder 21 and the brakes at the main clutch are operated. To bring the car to an emergency stop both brakes 19 and 33 are operated.

In order to provide a means whereby tires may be supplied with air from the air brake system, the hand controlled cock valve 35 is employed and there is connected thereto a hose 36. When this is used the piston in cylinder 25 is rendered inoperative by the closing of the valve 28.

From the foregoing description taken in connection with the drawings, it is evident that with an air brake system controlled and arranged as herein set forth, the motor car is at all times under the control of the driver and in any case where it is desirable and necessary to bring the car to a halt this can be accomplished with the least physical exertion, it being merely necessary to operate the control valves 19 and 33.

What I claim as new is:—

In an air brake system for a motor vehicle having a drive shaft, a main reservoir, an air-pump connected with the main reservoir, a rotatable shaft operably connected to the drive shaft, a gear carried by the said rotatable shaft, a second rotatable shaft operably connected to the pump, a gear loose on the last mentioned shaft and meshing with the first gear, clutch means for removably connecting the last mentioned gear with its shaft so that the gear will rotate with the shaft, a cylinder operably connected to the clutch means and in communication with the reservoir, and an automatic control valve in the system adjacent the cylinder for admitting air to the latter when the pressure in the reservoir drops below a pre-determined point, whereby the operative connections between the cylinder and the said clutch means will cause the operation of the latter to set the pump in operation for the restoration of the pressure in the reservoir.

In testimony whereof I affix my signature.

WALTER H. UTTERBAUGH.